US012030322B2

(12) United States Patent
Oi

(10) Patent No.: US 12,030,322 B2
(45) Date of Patent: Jul. 9, 2024

(54) PRINTING APPARATUS, PRETREATMENT AGENT INJECTION DEVICE, AND PRINTING METHOD

(71) Applicant: SEIKO EPSON CORPORATION, Tokyo (JP)

(72) Inventor: Tomoyuki Oi, Matsumoto (JP)

(73) Assignee: Seiko Epson Corporation, Tokyo (JP)

(*) Notice: Subject to any disclaimer, the term of this patent is extended or adjusted under 35 U.S.C. 154(b) by 94 days.

(21) Appl. No.: 17/654,198

(22) Filed: Mar. 9, 2022

(65) Prior Publication Data

US 2022/0288935 A1 Sep. 15, 2022

(30) Foreign Application Priority Data

Mar. 11, 2021 (JP) ................................ 2021-039068

(51) Int. Cl.

*B41J 2/21* (2006.01)
*B41J 2/165* (2006.01)
*B41J 29/13* (2006.01)
*B41M 5/00* (2006.01)

(52) U.S. Cl.

CPC ......... *B41J 2/2114* (2013.01); *B41J 2/16505* (2013.01); *B41J 29/13* (2013.01); *B41J 2202/21* (2013.01); *B41M 5/0011* (2013.01); *B41M 5/0017* (2013.01)

(58) Field of Classification Search

CPC .. B41J 2/2114; B41J 2/16505; B41J 2202/21; B41J 29/13; B41M 5/0011; B41M 5/0017

See application file for complete search history.

(56) References Cited

U.S. PATENT DOCUMENTS 11,472,194 B2 * 10/2022 Sekiguchi ............... D06P 5/002
2015/0273866 A1 10/2015 Sakai

FOREIGN PATENT DOCUMENTS

JP H10-235235 A 9/1998
JP 2005-246734 A 9/2005
JP 2015-183331 A 10/2015
JP 2015-193943 A 11/2015

* cited by examiner

*Primary Examiner* — Geoffrey S Mruk
(74) *Attorney, Agent, or Firm* — WORKMAN NYDEGGER

(57) ABSTRACT

A printing apparatus includes a support portion supporting a medium, a jetting unit configured to jet a pretreatment agent onto the medium supported on the support portion, a lid member to which the jetting unit is attached, the lid member being configured to cover a printing region of the medium, an ejecting unit configured to eject ink onto the printing region to which the pretreatment agent is jetted from the jetting unit, and a moving unit configured to move the support portion to a first position at which the lid member is configured to cover the printing region and a second position at which the ejecting unit is configured to eject the ink onto the printing region.

11 Claims, 13 Drawing Sheets

PRINTING APPARATUS, PRETREATMENT AGENT INJECTION DEVICE, AND PRINTING METHOD

The present application is based on, and claims priority from JP Application Serial Number 2021-039068, filed Mar. 11, 2021, the disclosure of which is hereby incorporated by reference herein in its entirety.

BACKGROUND

1. Technical Field

The present disclosure relates to a printing apparatus, a pretreatment agent jetting device, and a printing method.

2. Related Art

Various known printing apparatuses have been used. Among such printing apparatuses, there is a printing apparatus for printing on a medium such as fabric. In some cases, printing on fabric or the like is performed with a printing region provided with a pretreatment agent before an image is formed on the medium. The printing region may be provided with the pretreatment agent through application using a roller, spraying using a spray, or the like. As described in JP-A-2005-246734, a printing apparatus may be provided with a pretreatment unit that obtains a pretreatment agent in a granular form and applies the same.

Unfortunately, the application of the pretreatment agent using a roller might lead to application irregularity, depending on the skill level of the worker. Furthermore, the application of the pretreatment agent through spraying using a spray might lead to the pretreatment agent scattering around the medium, resulting in contamination of the periphery of the medium by the pretreatment agent, because it is difficult to spray the pretreatment agent only onto the printing region. For example, an application device including a spray as described in JP-A-10-235235 may be used. Still, the periphery of the medium may be contaminated with a pretreatment agent. Furthermore, the application device needs to be prepared, requiring an installation space and may lead to cost increase. All things considered, the printing region of a medium has been difficult to be suitably provided with the pretreatment agent, using a known printing apparatus that provides the printing region of the medium with the pretreatment agent and then performs the printing.

SUMMARY

A printing apparatus according to the present disclosure for solving the above-described problems includes a support portion supporting a medium, a jetting unit configured to jet a pretreatment agent onto the medium supported on the support portion, a lid member to which the jetting unit is attached, the lid member being configured to cover a printing region of the medium, an ejecting unit configured to eject ink onto the printing region to which the pretreatment agent is jetted from the jetting unit, and a moving unit configured to move the support portion to a first position at which the lid member is configured to cover the printing region and a second position at which the ejecting unit is configured to eject the ink onto the printing region.

A pretreatment agent jetting device according to the present disclosure for solving the above-described problems is a pretreatment agent jetting device used in a printing apparatus that performs printing with ink ejected onto a pretreatment agent provided to a printing region of a medium and including a jetting unit configured to jet the pretreatment agent and a lid member to which the jetting unit is attached, the lid member being configured to cover the printing region.

A printing method according to the present disclosure for solving the above-described problems is a printing method for a printing apparatus that includes a support portion supporting a medium, a jetting unit configured to jet a pretreatment agent onto the medium supported on the support portion, a lid member to which the jetting unit is attached, the lid member being configured to cover a printing region of the medium, an ejecting unit configured to eject ink onto the printing region to which the pretreatment agent is jetted from the jetting unit, and a moving unit configured to move the support portion to a first position at which the lid member is configured to cover the printing region and a second position at which the ejecting unit is configured to eject the ink onto the printing region, and the printing method includes supporting the medium on the support portion at the first position, covering the printing region with the lid member with the support portion being at the first position, causing the jetting unit to jet the pretreatment agent onto the medium with the printing region covered with the lid member, and moving the support portion from the first position to the second position and performing printing with the ink ejected from the ejecting unit.

DESCRIPTION OF EXEMPLARY EMBODIMENTS

Figure 1:
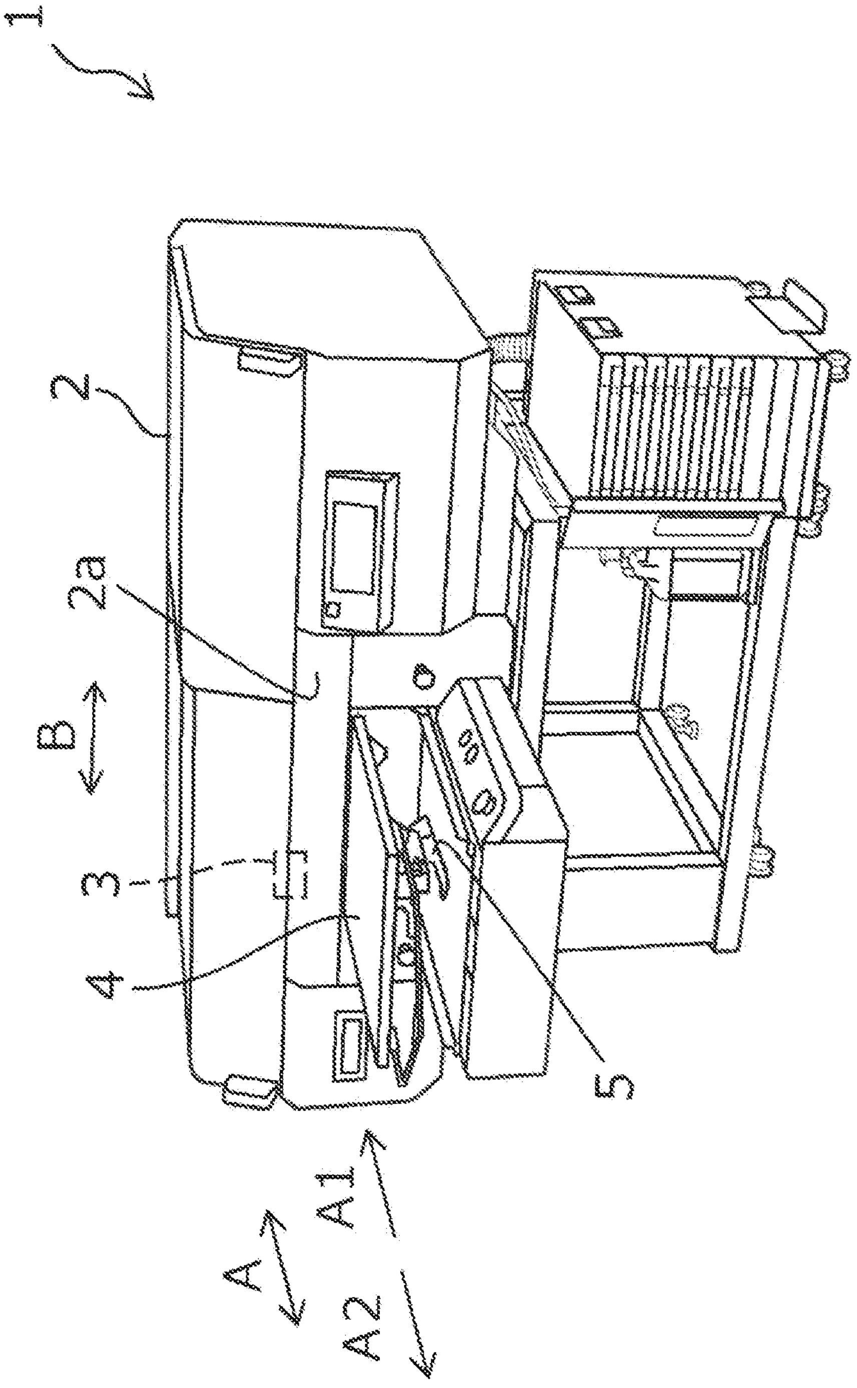
FIG. 1 is a schematic perspective view illustrating the appearance of a printing apparatus according to Example 1 of the present disclosure.

First, the present disclosure will be schematically described.

A printing apparatus according to a first aspect of the present disclosure for solving the above-described problems includes a support portion supporting a medium, a jetting unit configured to jet a pretreatment agent onto the medium supported on the support portion, a lid member to which the jetting unit is attached, the lid member being configured to cover a printing region of the medium, an ejecting unit configured to eject ink onto the printing region to which the pretreatment agent is jetted from the jetting unit, and a moving unit configured to move the support portion to a first position at which the lid member is configured to cover the printing region and a second position at which the ejecting unit is configured to eject the ink onto the printing region.

According to the present aspect, the jetting unit that jets the pretreatment agent onto the medium and the lid member configured to cover the printing region are provided. Thus, by jetting the pretreatment agent from the jetting unit with the printing region covered with the lid member, dispersion of the pretreatment agent can be suppressed, so that the printing region of the medium can be suitably provided with the pretreatment agent.

A printing apparatus according to a second aspect of the present disclosure includes an ink storage unit configured to store the ink, an ink flow path linking the ink storage unit and the ejecting unit, a pretreatment agent storage unit configured to store the pretreatment agent, a pretreatment agent flow path linking the pretreatment agent storage unit and the jetting unit, and a driving unit configured to provide driving force to supply the ink from the ink storage unit to the ejecting unit, in which the driving unit is configured to provide driving force to supply the pretreatment agent from the pretreatment agent storage unit to the jetting unit.

According to the present aspect, the driving unit is commonly used as a driving unit for providing the driving force to supply the ink from the ink storage unit to the ejecting unit and as a driving unit for providing the driving force to supply the pretreatment agent from the pretreatment agent storage unit to the jetting unit. Thus, the printing apparatus can be downsized and can be efficiently driven.

In a printing apparatus according to a third aspect of the present disclosure, in the first or second aspect, the lid member is configured to be positioned and form a sealed space inside by covering the printing region including the support portion supporting the medium.

According to the present aspect, the lid member is configured to be positioned and form a sealed space inside by covering the printing region including the support portion supporting the medium. Thus, easy positioning can be achieved, and the leakage of the pretreatment agent to the outside, leading to contamination of the outside, can be suppressed.

In a printing apparatus according to a fourth aspect of the present disclosure, in any one of the first to third aspects, the jetting unit is detachably attached to the lid member.

According to the present aspect, the jetting unit is detachably attached to the lid member. Thus, replacement, cleaning, and the like of the lid member can be easily performed.

In a printing apparatus according to a fifth aspect of the present disclosure, in the fourth aspect, a heater unit, in place of the jetting unit, is detachably attached to the lid member.

According to the present aspect, the heater unit, in place of the jetting unit, is detachably attached to the lid member. Thus, the ink and the pretreatment agent on the medium after the completion of the printing processing and the like can be suitably dried.

In a printing apparatus according to a sixth aspect of the present disclosure, in the fourth or fifth aspect, a first support portion and a second support portion that differs in at least one of size and shape from the first support portion are configured to be used as the support portion, and a first lid member corresponding to the first support portion and a second lid member corresponding to the second support portion are configured to be used as the lid member.

According to the present aspect, the first support portion and the second support portion can be used as the support portion, and the first lid member corresponding to the first support portion and the second lid member corresponding to the second support portion can be used as the lid member. Thus, the pretreatment agent can be suitably provided to the printing region on media of a plurality of sizes and shapes.

In a printing apparatus according to a seventh aspect of the present disclosure, in any one of the first to fifth aspects, a first support portion and a second support portion that differs in at least one of size and shape from the first support portion are configured to be used as the support portion, and the lid member includes a first fitting portion that fits with the first support portion and a second fitting portion that fits with the second support portion.

According to the present aspect, the first support portion and the second support portion can be used as the support portion, and the lid member includes the first fitting portion that fits with the first support portion and the second fitting portion that fits with the second support portion. Thus, the pretreatment agent can be suitably provided to the printing region on media of a plurality of sizes and shapes without replacing the lid member used.

In a printing apparatus according to an eighth aspect of the present disclosure, in any one of the first to seventh aspects, the lid member is configured to cover a non-printing region around the printing region as well as the printing region, and an interval between the lid member and the non-printing region is smaller than an interval between the lid member and the printing region in an interior of the lid member.

According to the present aspect, the interval between the lid member and the non-printing region is smaller than the interval between the lid member and the printing region in the interior of the lid member. That is, the height of the non-printing region is lower than that of the printing region in the interior of the lid member. As a result, the non-printing region is provided with the pretreatment agent in an amount smaller than that on the printing region. Therefore, a boundary mark of the pretreatment agent at the boundary portion between the printing region and the non-printing region does not stand out.

A printing apparatus according to a ninth aspect of the present disclosure includes, in any one of the first to eighth aspects, a housing unit configured to accommodate the ejecting unit and an arm member having one end portion coupled to the housing unit and another end portion coupled to the lid member, in which the arm member is configured to be displaced to a cover position at which the lid member covers the printing region when the support portion is at the first position and an open position at which the lid member does not cover the printing region when the support portion is at the first position, so as not to hinder movement of the support portion by the moving unit.

According to the present aspect, the arm member having one end portion coupled to the housing unit and the other end portion coupled to the lid member, the arm member being configured to be displaced to the cover position and the open position, is provided. Thus, the lid member can be precisely disposed at a suitable position during the pretreatment agent providing processing, and the lid member can be positioned so as not to be in the way in a period in which the pretreatment agent providing processing is not executed such as a period during the printing processing.

In a printing apparatus according to a tenth aspect of the present disclosure, in the ninth aspect, the lid member is detachably attached to the arm member.

According to the present aspect, the lid member is detachably attached to the arm member. Thus, the lid member can be removed when the pretreatment agent providing processing is not being executed, so that the lid member can be more effectively disposed so as not to be in the way.

A pretreatment agent jetting device according to an eleventh aspect of the present disclosure is a pretreatment agent jetting device used in a printing apparatus that performs printing with ink ejected onto a medium and including a jetting unit configured to jet a pretreatment agent and a lid member to which the jetting unit is attached, the lid member being configured to cover a printing region of the printing apparatus.

According to the present aspect, the jetting unit that jets the pretreatment agent and the lid member configured to cover the printing region are provided. Thus, by jetting the pretreatment agent from the jetting unit with the printing region covered with the lid member, dispersion of the pretreatment agent can be suppressed, so that the printing region of the medium can be suitably provided with the pretreatment agent.

A printing method according to a twelfth aspect of the present disclosure is a printing method for a printing apparatus that includes a support portion supporting a medium, a jetting unit configured to jet a pretreatment agent onto the medium supported on the support portion, a lid member to which the jetting unit is attached, the lid member being configured to cover a printing region of the medium, an ejecting unit configured to eject ink onto the printing region to which the pretreatment agent is jetted from the jetting unit, and a moving unit configured to move the support portion to a first position at which the lid member is configured to cover the printing region and a second position at which the ejecting unit is configured to eject the ink onto the printing region, and the printing method includes supporting the medium on the support portion at the first position, covering the printing region with the lid member with the support portion being at the first position, causing the jetting unit to jet the pretreatment agent onto the medium with the printing region covered with the lid member, and moving the support portion from the first position to the second position and performing printing with the ink ejected from the ejecting unit.

According to the present aspect, the medium is supported on the support portion at the first position, the printing region is covered with the lid member with the support portion being at the first position, the jetting unit is caused to jet the pretreatment agent onto the medium with the printing region covered with the lid member, and the support portion is moved from the first position to the second position and printing is performed with the ink ejected from the ejecting unit. Thus, the printing processing can be suitably executed after the pretreatment agent is suitably provided on the printing region of the medium.

Exemplary embodiments of the present disclosure will be described in detail below with reference to the accompanying drawings.

Example 1

First of all, an overview of a printing apparatus 1 according to Example 1 of the present disclosure will be described with reference to FIG. 1 to FIG. 4. As illustrated in FIG. 1, the printing apparatus 1 according to the example includes a support portion 4 for supporting a medium M and includes an ejecting unit 3 that ejects ink. Then, movement of the support portion 4 supporting the medium M along a transport direction A and ejection of the ink from the ejecting unit 3 moving to reciprocate in a scanning direction B are alternately repeated, and thus an image is formed in a printing region R1 of the medium M.

Figure 2:
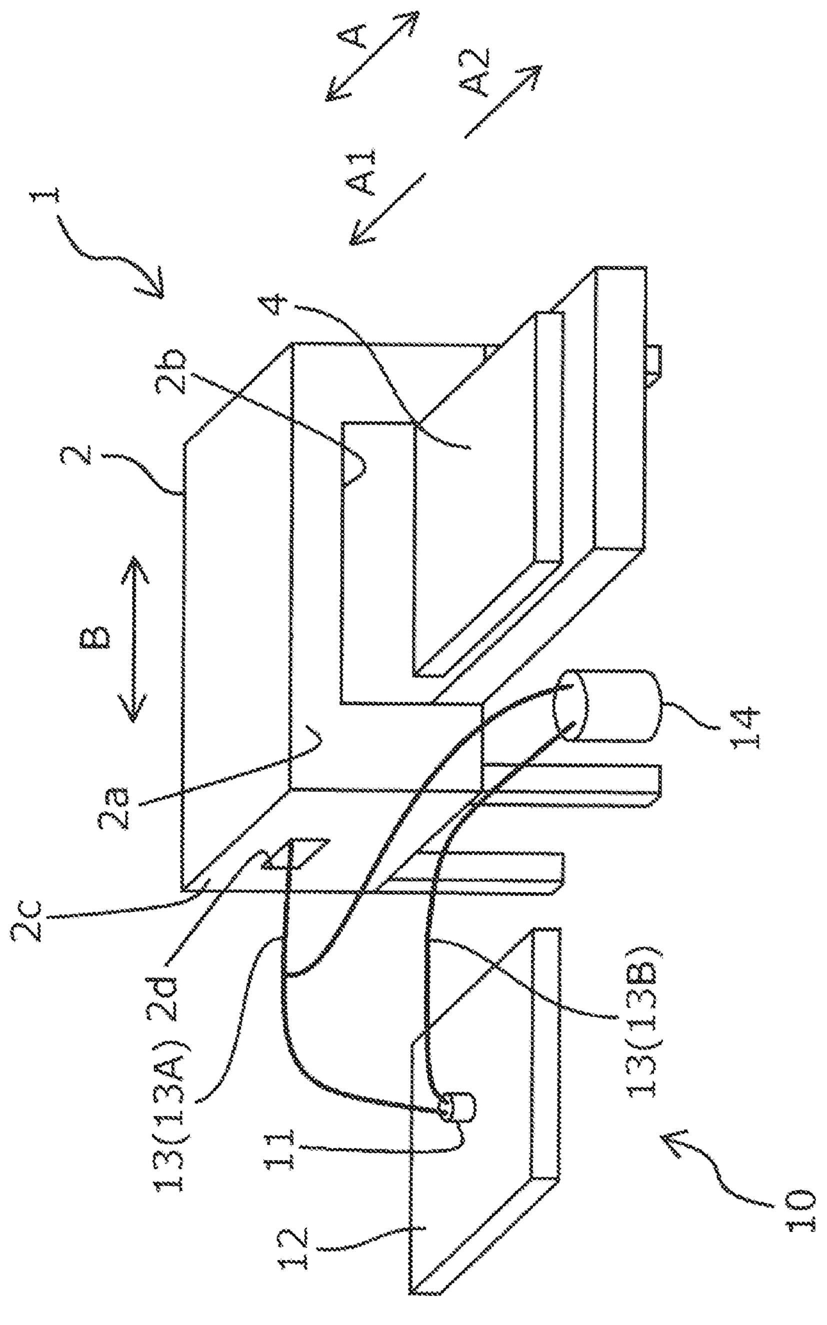
FIG. 2 is a schematic perspective view of the printing apparatus according to Example 1 of the present disclosure, illustrating a state in which a printing region of a medium is not covered with a lid member.
Figure 3:
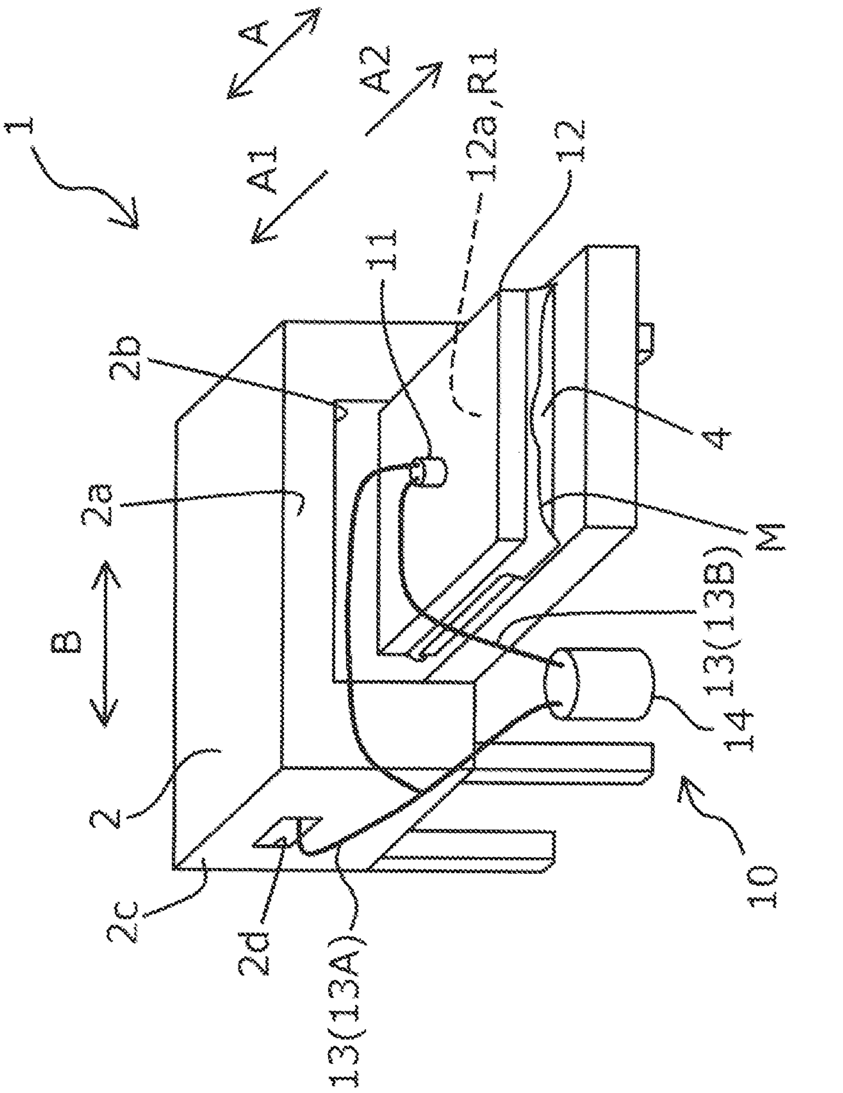
FIG. 3 is a schematic perspective view of the printing apparatus according to Example 1 of the present disclosure, illustrating a state in which the printing region of the medium is covered with the lid member.
Figure 4:
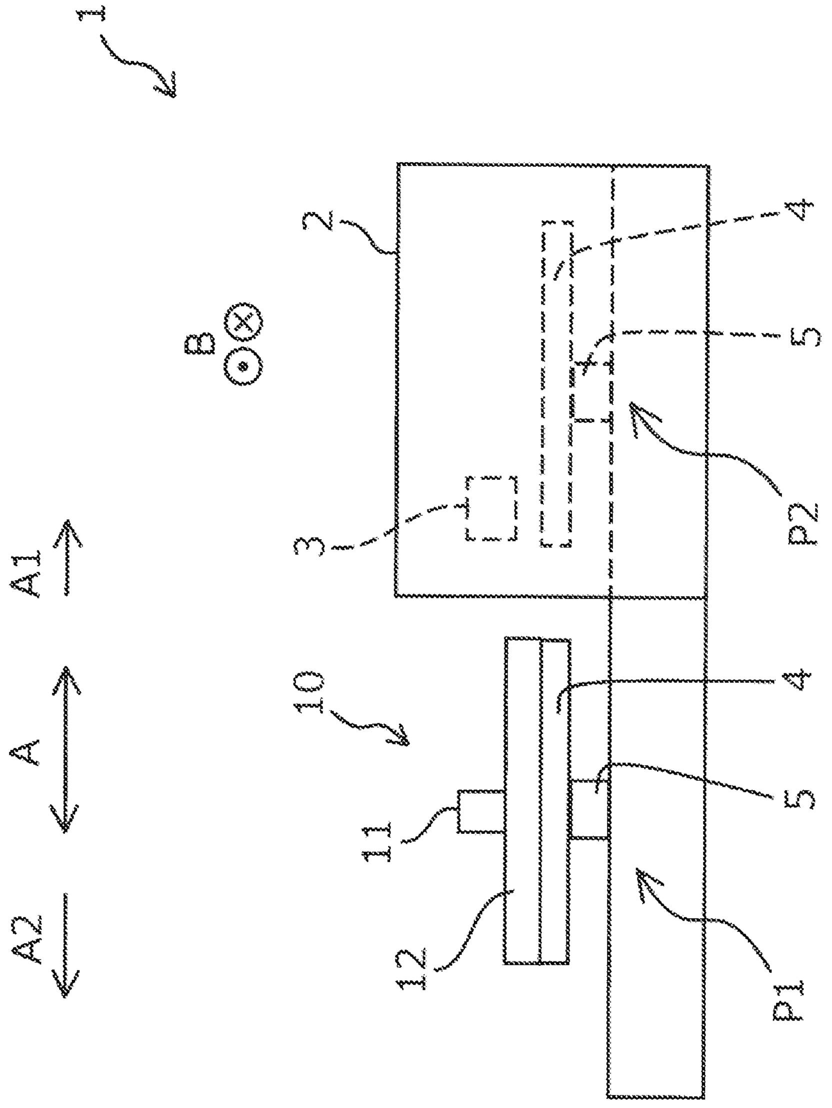
FIG. 4 is a schematic side view of the printing apparatus according to Example 1 of the present disclosure.

As illustrated in FIG. 1 and FIG. 4, the ejecting unit 3 is provided inside the housing unit 2. As illustrated in FIG. 4, the support portion 4 is movable to a first position P1 that is a set position of the medium M at which the printing region R1 of the medium M can be covered with a lid member 12 described later and to a second position P2 at which the ejecting unit 3 is enabled to eject ink onto the printing region R1. As illustrated in FIG. 4, the first position P1 is outside the housing unit 2, and the second position P2 is inside the housing unit 2. Note that, as illustrated in FIG. 2 and FIG. 3, an opening portion 2*b* is provided in a front surface portion 2*a* of the housing unit 2, and the support portion 4 is movable to the first position P1 and the second position P2 through the opening portion 2*b*. The support portion 4 is detachably supported on a support 5, and moves along the transport direction A as the support 5 moves along the transport direction A. In other words, the support 5 serves as a moving unit for the support portion 4, together with a drive motor (not illustrated) that moves the support 5 and the like. The medium M may be set on the support portion 4 with the support portion 4 removed from the support 5 so that the medium M can be set on the support portion 4 at a location separated from the printing apparatus 1. Still, since the first position P1 is outside the housing unit 2 and is at an open space, workability would not be so compromised with the medium M set on the support portion 4 in a state where the support portion 4 is attached to the support 5.

In the printing apparatus 1 according to the example, when the printing processing is executed, the support portion 4 at the first position P1 is first transported in a direction A1 to the second position P2, and then an image is formed in the printing region R1 of the medium M, while the support portion 4 is transported in a direction A2 from the second position P2 to the first position P1. Note that the printing apparatus 1 according to the example is configured to perform printing with the movement of the support portion 4 in the transport direction A and the movement of the ejecting unit 3 to reciprocate in the scanning direction B alternately repeated, but is not limited to such a configuration. For example, a configuration may be employed in which what is known as line head having a nozzle formed is provided as the ejecting unit 3. This nozzle ejects ink over the entirety of the printing region R1 in a direction intersecting with the transport direction A. The type of ink that can be used is not particularly limited, and in addition to the color ink for forming an image, such as black ink, cyan ink, magenta ink, and yellow ink, white ink for forming a white foundation before an image is formed on a dark color medium P, varnish ink for overcoating an image, and the like may be used as appropriate.

The printing apparatus 1 according to the example can perform printing on various types of objects serving as the medium M. Among those, the printing can be particularly suitably performed on fabric such as a T-shirt. When the printing is performed on fabric serving as the medium M, the printing region R1 of the medium M is preferably provided with a pretreatment agent before an image is formed. Thus, the printing apparatus 1 according to the example is configured to enable the printing region R1 of the medium M to be provided with the pretreatment agent. A pretreatment agent jetting device 10 provided to the printing apparatus 1 and configured to provide the printing region R1 of the medium M with the pretreatment agent will be described with reference to FIG. 5 to FIG. 10 in addition to FIG. 1 to FIG. 4.

Figure 5:
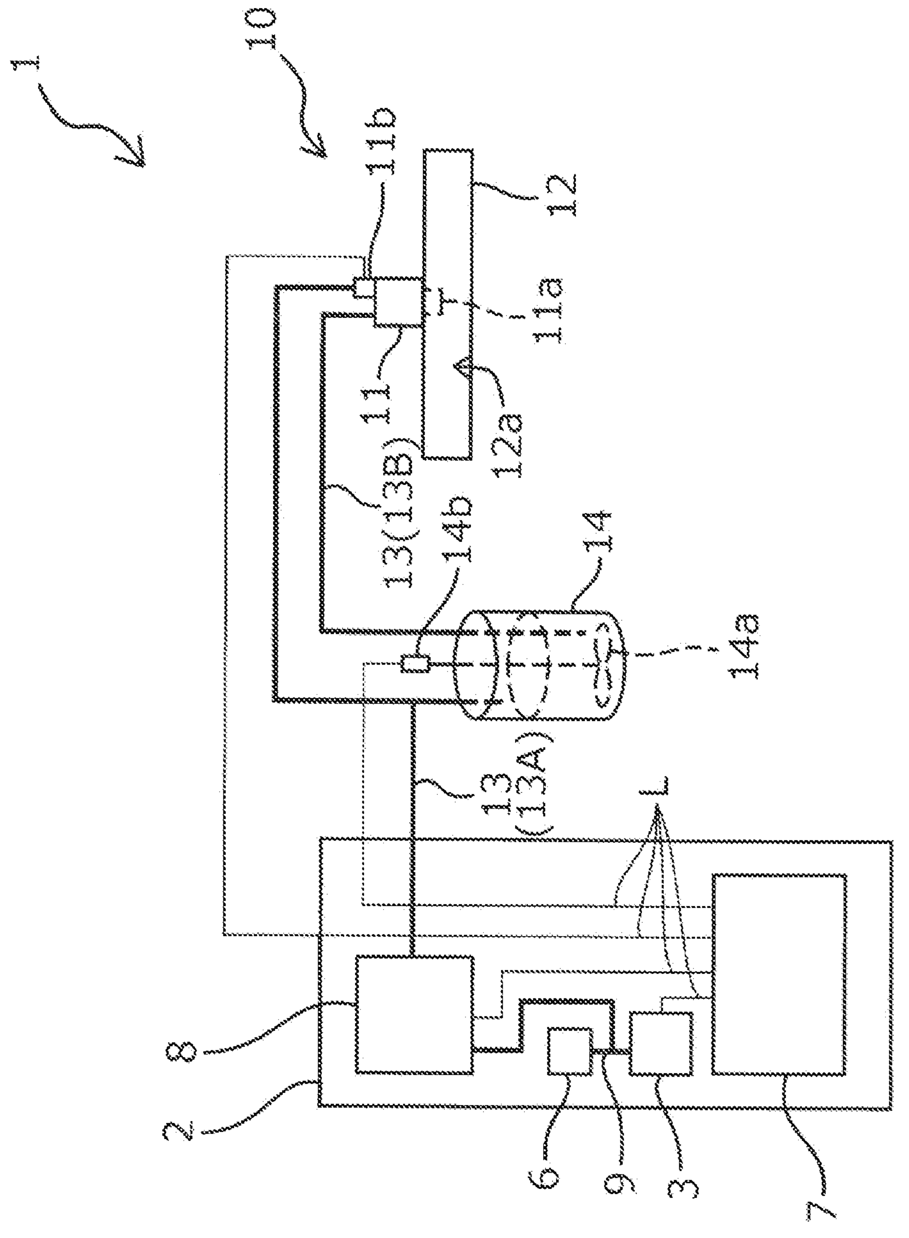
FIG. 5 is a block diagram illustrating the printing apparatus according to Example 1 of the present disclosure.

The pretreatment agent jetting device 10 includes a jetting unit 11 configured to jet the pretreatment agent as illustrated in FIG. 2 to FIG. 6 and the like and the lid member 12 configured to cover the support portion 4 supporting the medium M as illustrated in FIG. 3. Furthermore, as illustrated in FIG. 2, FIG. 3, and FIG. 5, the pretreatment agent jetting device 10 includes a pretreatment agent storage unit 14 that stores the pretreatment agent and a tube 13 serving as a flow path of air or the pretreatment agent.

Figure 6:
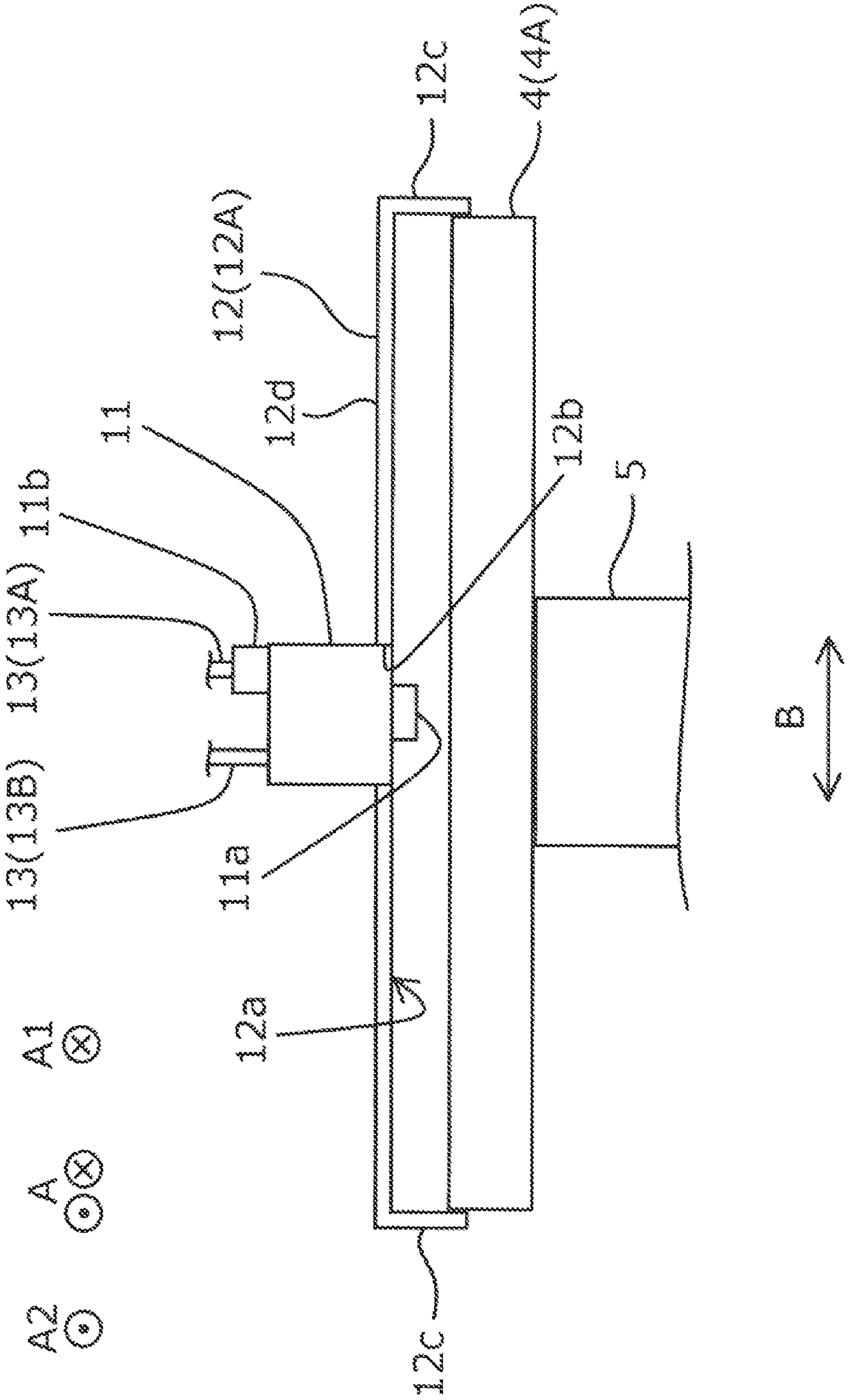
FIG. 6 is a schematic view illustrating a part of a pretreatment agent jetting device of the printing apparatus according to Example 1 of the present disclosure.

As illustrated in FIG. 5 and FIG. 6, the jetting unit 11 includes a spray opening forming portion 11*a* provided in an interior 12*a* of the lid member 12 and configured to spray the pretreatment agent in a form of mist in the interior 12*a* and an electromagnetic valve 11*b* coupled to an air flow path tube 13A of the tube 13. As illustrated in FIG. 5, the pretreatment agent storage unit 14 is coupled to the air flow path tube 13A, is provided with a stirring bar 14*a* and a stirring bar driving unit 14*b*, and is coupled to the jetting unit 11 through a pretreatment agent flow path tube 13B of the tube 13. As illustrated in FIG. 2 and FIG. 3, the air flow path tube 13A is drawn out from the inside of the housing unit 2 through an opening portion 2*d* that is provided in a side surface part 2*c* of the housing unit 2 and serves as an air inlet/outlet port. The pretreatment agent storage unit 14 is disposed outside the housing unit 2. Alternatively, the pretreatment agent storage unit 14 may be disposed inside the housing unit 2.

As illustrated in FIG. 5, the interior of the housing unit 2 of the printing apparatus 1 is provided with a pressure pump 8 with which the pressure inside the air flow path tube 13A can be adjusted and a control unit 7 that controls the overall driving of the printing apparatus 1. The pressure pump 8 is coupled to an ink flow path tube 9 that links the ejecting unit 3 and an ink storage unit 6 storing ink to be supplied to the ejecting unit 3 and also serves as a driving unit that provides driving force to supply the ink from the ink storage unit 6 to the ejecting unit 3. The pressure pump 8 according to the example is a pressurizing pump, but a decompression pump may be used. Furthermore, something other than the pressure pump may be used as the driving unit.

As illustrated in FIG. 5, through electrical wires L, the control unit 7 is coupled to the electromagnetic valve 11*b* and the stirring bar driving unit 14*b* as well as to the ejecting unit 3 and the pressure pump 8. In other words, the control unit 7 serves as a control unit used for purposes other than the control for the driving of the pretreatment agent jetting device 10 and as a control unit that controls the driving of the pretreatment agent jetting device 10. Similarly, the pressure pump 8 also serves as a driving unit used for purposes other than the driving of the pretreatment agent jetting device 10 and as a driving unit that drives the pretreatment agent jetting device 10. Thus, the control unit 7 and the pressure pump 8 may be regarded as configuring a part of the pretreatment agent jetting device 10.

As illustrated in FIG. 6, the lid member 12 is configured to have a facing surface 12*d*, facing the support portion 4, provided with a hole portion 12*b* and have a side surface 12*c*, intersecting with the facing surface 12*d*, fitting with the support portion 4. Since the medium M is thin, even when the medium M is placed to stick out from the support portion 4, the side surface 12*c* fits with the support portion 4 with the medium M interposed therebetween. However, this configuration should not be construed in a limiting sense, and a configuration such as that in which the lid member 12 is placed on the support portion 4 may be employed. The jetting unit 11 is attached to the hole portion 12*b* of the lid member 12 and is configured to be detachably attached to the lid member 12.

Figure 7:
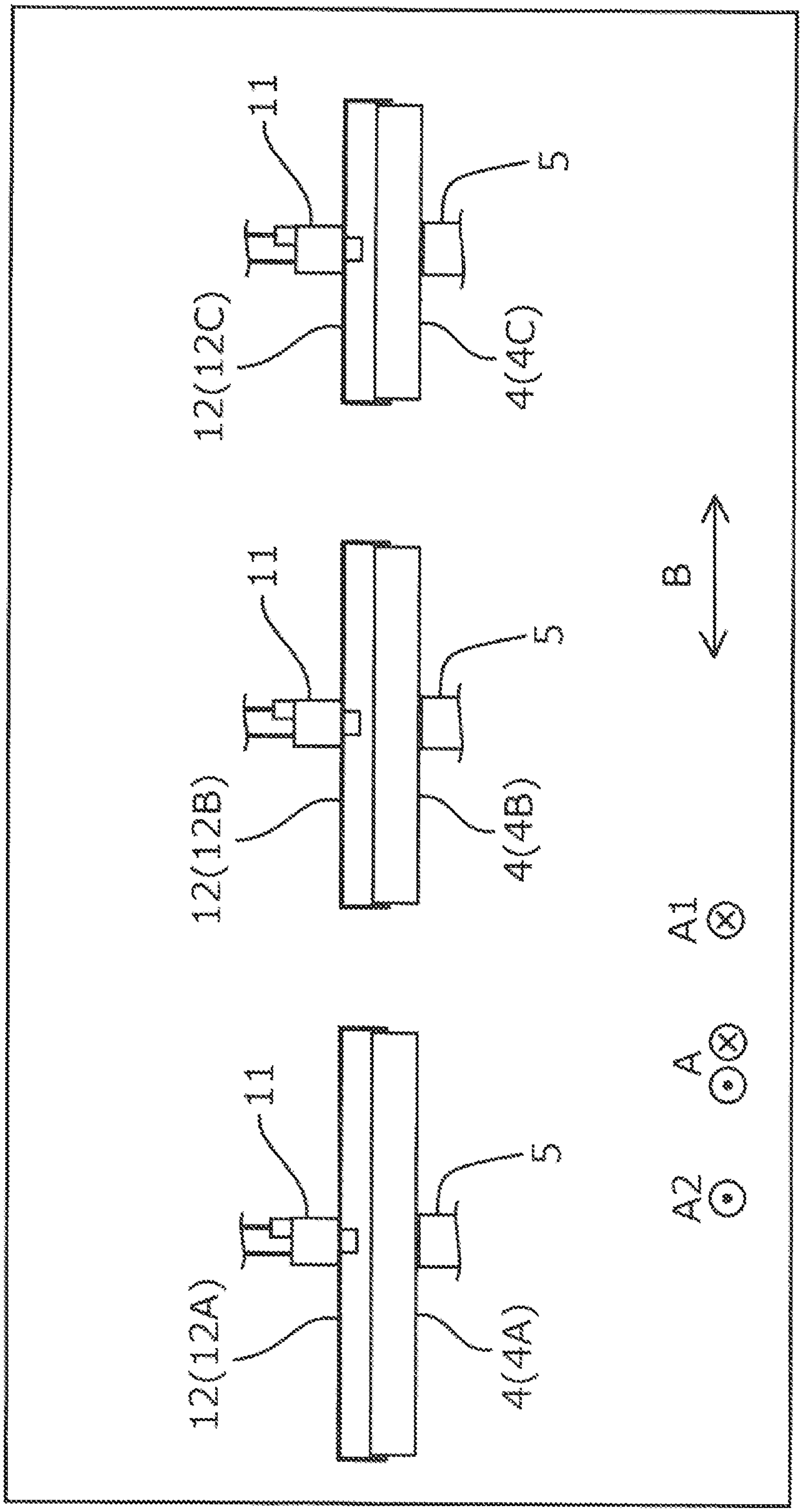
FIG. 7 is a schematic view illustrating an example of a support portion and the lid member that can be used in the printing apparatus according to Example 1 of the present disclosure.

As described above, the jetting unit 11 is detachably attached to the lid member 12, and the support portion 4 is detachably supported on the support 5. Thus, one of a plurality of the support portions 4 and of the lid members 12 can be used for the printing apparatus 1 according to the example, depending on the size and shape of the medium M to be used. For example, as illustrated in FIG. 7, when a large medium M or the like is used, a large support portion 4A and a large lid member 12A can be used. Alternatively, a support portion 4B smaller than the support portion 4A and a lid member 12B smaller than the lid member 12A may be used. Alternatively, a support portion 4C even smaller than the support portion 4B and a lid member 12C even smaller than the lid member 12B may be used.

Now, a summary of what has been described above will be given. The printing apparatus 1 according to the example includes the support portion 4 supporting the medium M, the jetting unit 11 configured to jet the pretreatment agent onto the medium M supported on the support portion 4, and the lid member 12 to which the jetting unit 11 is attached, the lid member 12 being configured to cover the printing region R1 of the medium M. The printing apparatus 1 according to the example includes the ejecting unit 3. The ejecting unit 3 is configured to eject ink onto the printing region R1 to which the pretreatment agent is jetted from the jetting unit 11. The printing apparatus 1 according to the example includes the support 5 as a moving unit as described above. The support 5 is configured to move the support portion 4 to the first position P1 at which the lid member 12 is configured to cover the printing region R1 and the second position P2 at which the ejecting unit 3 is configured to eject the ink onto the printing region R1.

As described above, the printing apparatus 1 according to the example includes the jetting unit 11 that jets the pretreatment agent onto the medium M and the lid member 12 configured to cover the printing region R1. Thus, by jetting the pretreatment agent from the jetting unit 11 with the printing region R1 covered with the lid member 12, dispersion of the pretreatment agent can be suppressed, so that the printing region R1 of the medium M can be suitably provided with the pretreatment agent. The support portion 4 is configured to move to the first position P1, at which the printing region R1 can be covered with the lid member 12 and the second position P2 at which ink can be discharged from the ejecting unit 3 onto the printing region R1. For this reason, the support portion 4 can be positioned at the first position P1 and the medium M can be easily set, and the support portion 4 can be positioned at the second position P2 during printing and thus the printing processing can be suitably performed.

As described above, the printing apparatus 1 according to the example includes the ink storage unit 6 configured to store the ink, the ink flow path tube 9 that is an ink flow path linking the ink storage unit 6 and the ejecting unit 3, the pretreatment agent storage unit 14 configured to store the pretreatment agent, the pretreatment agent flow path tube 13B that is a pretreatment agent flow path linking the pretreatment agent storage unit 14 and the jetting unit 11, and the pressure pump 8 that is a driving unit configured to provide driving force to supply the ink from the ink storage unit 6 to the ejecting unit 3. The pressure pump 8 is configured to provide driving force to supply the pretreatment agent from the pretreatment agent storage unit 14 to the jetting unit 11. Thus, in the printing apparatus 1 according to the example, the pressure pump 8 is commonly used as a driving unit for providing the driving force to supply the ink from the ink storage unit 6 to the ejecting unit 3 and as a driving unit for providing the driving force to supply the pretreatment agent from the pretreatment agent storage unit 14 to the jetting unit 11, so that the printing apparatus 1 can be downsized and can be efficiently driven.

In the printing apparatus 1 according to the example, the lid member 12 is configured to be positioned and form a sealed space inside 12*a* by covering the printing region R1 including the support portion 4 supporting the medium M. Thus, the lid member 12 can be easily positioned with respect to the support portion 4, and the leakage of the pretreatment agent to the outside of the lid member 12, leading to contamination of the outside, can be suppressed.

As described above, the jetting unit 11 is detachably attached to the lid member 12. Thus, replacement, cleaning, and the like of the lid member 12 can be easily performed.

Figure 9:
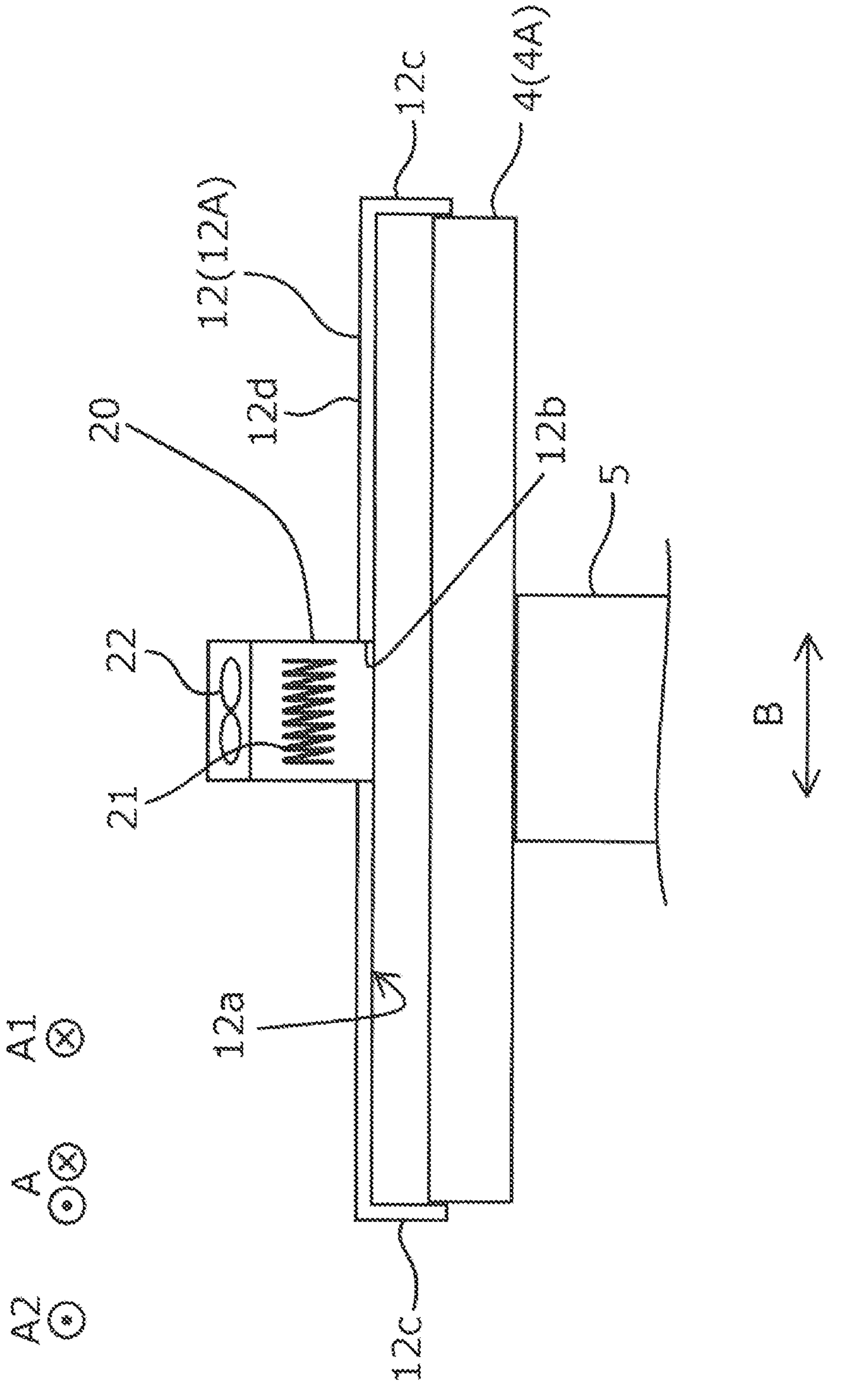
FIG. 9 is a schematic view illustrating a state in which a heater unit that can be used in the printing apparatus according to Example 1 of the present disclosure is attached to the lid member.

The printing apparatus 1 according to the example can have the jetting unit 11 removed from the lid member 12 and have a heater unit 20 attached to the lid member 12 in place of the jetting unit 11, as illustrated in FIG. 9. With the heater unit 20 thus being detachably attached to the lid member 12 in place of the jetting unit 11, the printing apparatus 1 according to the example enables the ink and the pretreatment agent on the medium M after the completion of the printing processing and the like to be suitably dried. The heater unit 20 according to the example includes a heating wire 21 and a fan 22 as illustrated in FIG. 9, but the configuration of the heater unit 20 is not particularly limited.

As described above, in the printing apparatus 1 according to the example, a plurality of different support portions 4 as well as a plurality of different lid members 12 can be used. In other words, in the printing apparatus 1 according to the example, a first support portion such as the support portion 4A, for example, and a second support portion, such as the support portion 4B or the support portion 4C, differing in at least one of size and shape from the first support portion are configured to be used as the support portion 4. As the lid member 12, for example, the lid member 12A as a first lid member corresponding to the first support portion, for example, and the lid member 12B or the lid member 12C as a second lid member corresponding to the second support portion, for example, are configured to be used. Thus, with the printing apparatus 1 according to the example, the pretreatment agent can be suitably provided to the printing region R1 on media M of a plurality of sizes and shapes.

Figure 8:
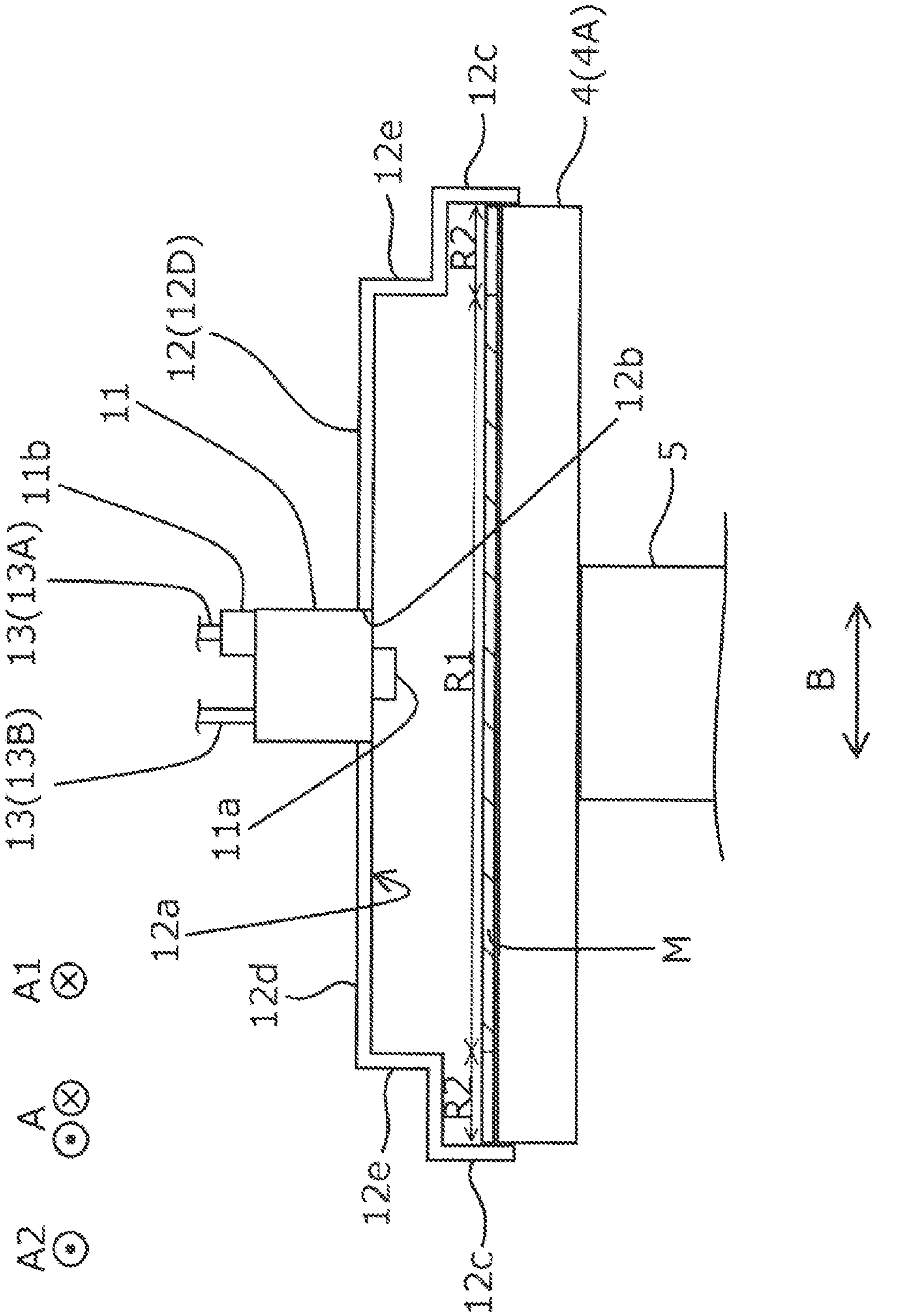
FIG. 8 is a schematic view illustrating an example, different from FIG. 7, of the lid member that can be used in the printing apparatus according to Example 1 of the present disclosure.

In the printing apparatus 1 according to the example, a lid member 12D illustrated in FIG. 8 can be used as the lid member 12. As described above, in the printing apparatus 1 according to the example, the support portion 4A as the first support portion and the support portion 4B as the second support portion that differs in at least one of size and shape from the support portion 4A are configured to be used as the support portion 4. Here, the lid member 12D includes the side surface 12*c* as a first fitting portion that fits with the support portion 4A and a side surface 12*e* as a second fitting portion that fits with the support portion 4B. Thus, with the printing apparatus 1 according to the example, a plurality of support portions 4 can be used without replacing the lid member 12 used, and the pretreatment agent can be suitably provided to the printing region R1 on media M of a plurality of sizes and shapes.

When the support portion 4A is used as the support portion 4 as illustrated in FIG. 8, a non-printing region R2 that is a region of the medium M around the printing region R1 is included within the interior 12*a* of the lid member 12. In other words, the lid member 12D is configured to cover the non-printing region R2 around the printing region R1 as well as the printing region R1, and an interval between the lid member 12D and the non-printing region R2 is smaller than an interval between the lid member 12D and the printing region R1 in the interior of the lid member 12D. When the pretreatment agent providing processing is executed under such an arrangement, the non-printing region R2 is provided with the pretreatment agent in an amount smaller than that on the printing region R1, because the height of the non-printing region R2 is lower than that of the printing region R1 in the interior 12*a*. Therefore, a boundary mark of the pretreatment agent at the boundary portion between the printing region R1 and the non-printing region R2 does not stand out. Thus, with the lid member 12 having a stepped step such as the lid member 12D, it is possible to prevent the boundary mark of the pretreatment agent from standing out.

Figure 10:
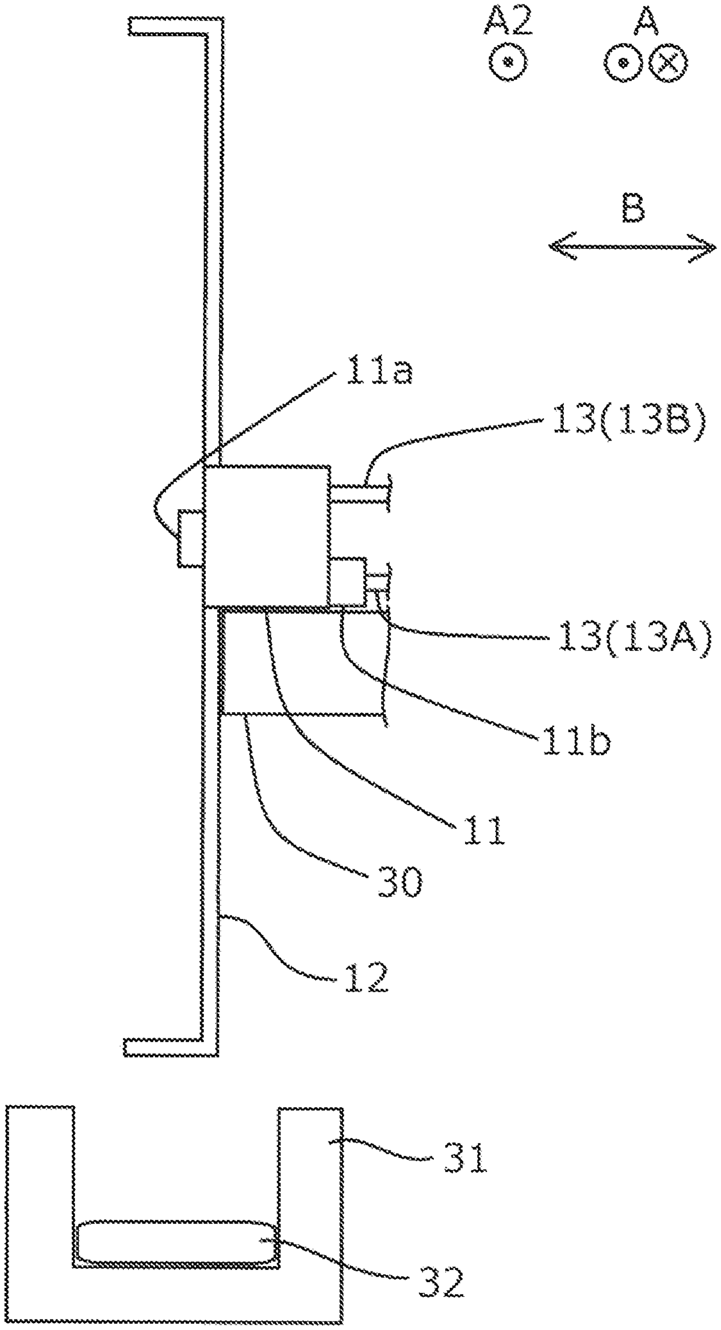
FIG. 10 is a schematic view illustrating a lid member accommodation portion of the printing apparatus according to Example 1 of the present disclosure.

Furthermore, as illustrated in FIG. 10, the printing apparatus 1 according to the example includes a lid member accommodation portion 30 in which the lid member 12 can be accommodated when the pretreatment agent providing processing is not being executed. The lid member accommodation portion 30 according to the example is configured to extend from the housing unit 2 and enable the jetting unit 11 to be hooked thereon to accommodate the lid member 12, but is not limited to such a configuration. Furthermore, the lower portion of the lid member accommodation portion 30 is provided with a pretreatment agent receiver 31 that receives the pretreatment agent attached to the jetting unit 11 or the lid member 12. The pretreatment agent receiver 31 is provided with a replaceable absorbent member 32. The configuration of the pretreatment agent receiver 31 is not particularly limited, and the pretreatment agent receiver 31 may not be provided.

Example 2

Figure 11:
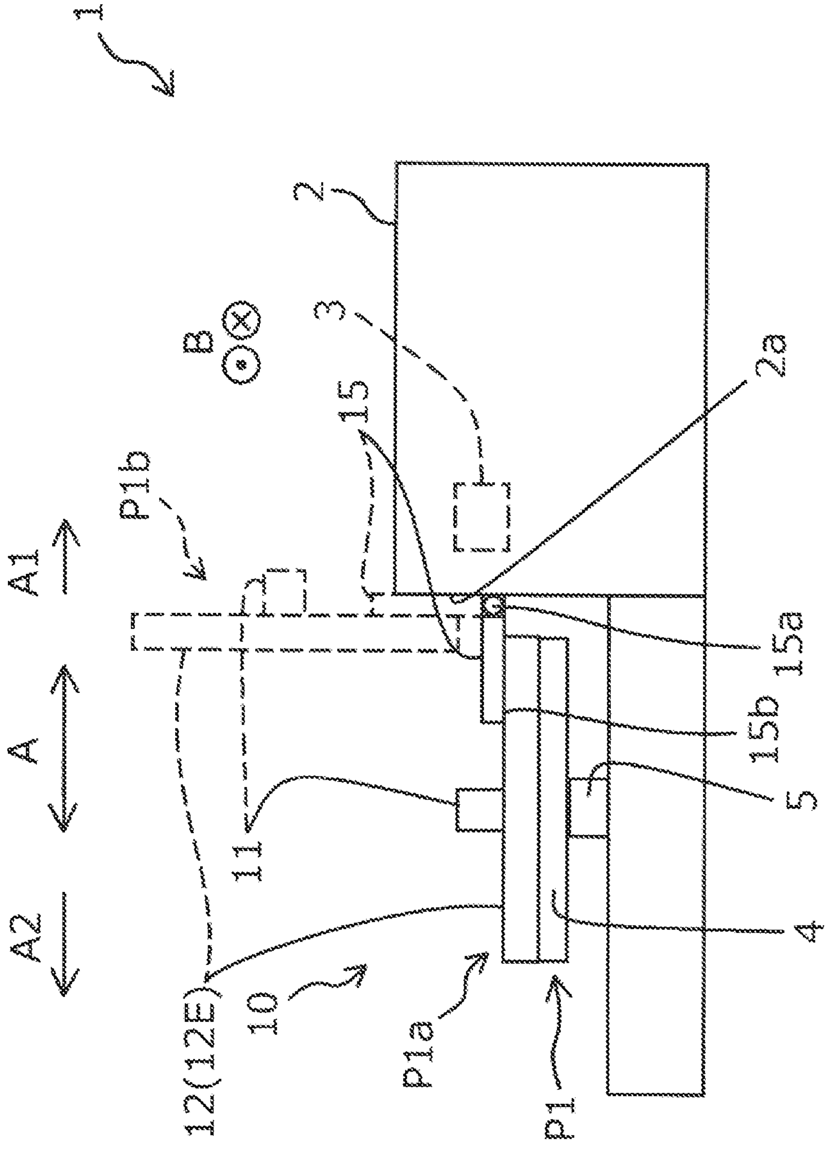
FIG. 11 is a schematic side view of a printing apparatus according to Example 2 of the present disclosure.

Next, a printing apparatus 1 according to Example 2 will be described with reference to FIG. 11. FIG. 11 is a diagram corresponding to FIG. 4 for the printing apparatus 1 according to Example 1. Note that in FIG. 11, the constituent members common to those in Example 1 described above are denoted by the same reference numerals, and the detailed description will be omitted. The printing apparatus 1 according to the example has a shape similar to that of the printing apparatus 1 according to Example 1, except that an arm member 15 coupled to the lid member 12 and the housing unit 2 is provided. Thus, the printing apparatus 1 according to the example has features similar to those of the printing apparatus 1 according to Example 1, except for those described below.

As illustrated in FIG. 11, the printing apparatus 1 according to the example includes the housing unit 2 configured to accommodate the ejecting unit 3 as in the printing apparatus 1 according to Example 1, and further includes the arm member 15 having a rotary shaft 15*a* at one end portion coupled to the front surface portion 2*a* of the housing unit 2 and having the other end portion 15*b* coupled to a lid member 12E serving as the lid member 12. The arm member 15 is configured to be displaced to a cover position P1*a*, indicated by a solid line in FIG. 11, at which the lid member 12E covers the printing region R1 when the support portion 4 is at the first position P1 and at an open position P1*b*, indicated by a dashed line in FIG. 11, at which the lid member 12E does not cover the printing region R1 when the support portion 4 is at the first position P1, so as not to hinder the movement of the support portion 4 by the support 5 serving as the moving unit. Thus, with the printing apparatus 1 according to the example, the lid member 12E can be precisely disposed at the cover position P1*a* that is a suitable position during the pretreatment agent providing processing, and the lid member 12E can be positioned at the open position P1*b* so as not to be in the way in a period in which the pretreatment agent providing processing is not executed such as a period during the printing processing. The printing apparatus 1 according to the example is configured in such a manner that a worker manually moves the lid member 12E to the cover position P1*a* and the open position P1*b*, but may also be configured in such a manner that the lid member 12E is automatically moved to the cover position P1*a* and the open position P1*b* under the control by the control unit 7 or the like, with a drive motor or the like provided for the arm member 15.

In the printing apparatus 1 according to the example, the lid member 12E is detachably attached to the arm member 15. Thus, the lid member 12E can be removed when the pretreatment agent providing processing is not being executed, so that the lid member 12E can be more effectively disposed so as not to be in the way. This configuration also enables the lid member 12E to be easily cleaned.

Example of Printing Method

Figure 12:
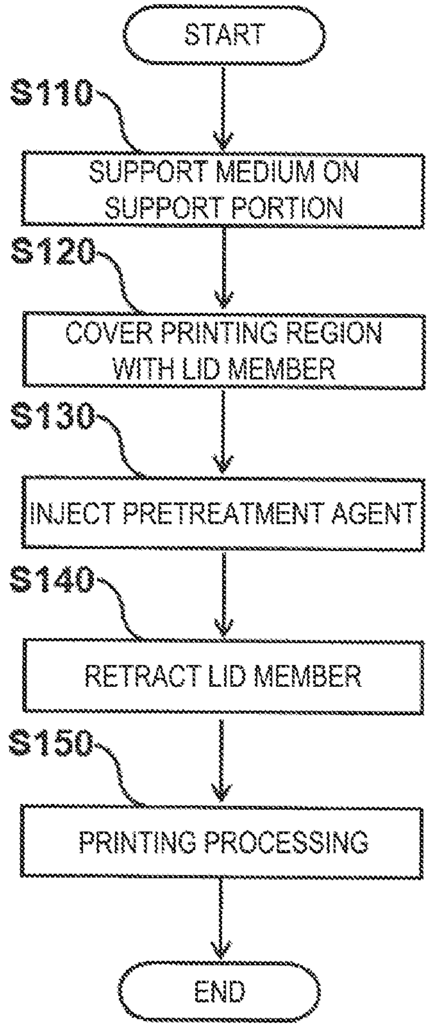
FIG. 12 is a flowchart illustrating an example of a printing method according to the present disclosure.

Next, an example of a printing method that can be performed by the printing apparatus 1 according to Example 1 and the printing apparatus 1 according to Example 2 will be described with reference to a flowchart in FIG. 12.

In the printing method according to the example, in step S110, the support portion 4 is positioned at the first position P1, and the medium M is supported on the support portion 4. Next, in step S120, the printing region R1 is covered with the lid member 12 with the support portion 4 being at the first position P1. Next, in step S130, the jetting unit 11 jets the pretreatment agent onto the medium M with the printing region R1 covered with the lid member 12. Then, in step S140, the lid member 12 is retracted from the printing region R1. Then, in step S150, the support portion 4 is moved from the first position P1 to the second position P2, and printing is performed with the ink ejected from the ejecting unit 3. The printing method according to the example ends when this step ends. Note that step S110, step S120, and step S140 are performed manually by the worker, and step S130 and step S150 are performed automatically under the control by the control unit 7. By performing the printing method according to the example, the printing processing can be suitably executed after the pretreatment agent is suitably provided on the printing region R1 of the medium M.

Example of Pretreatment Agent Injection Device

Figure 13:
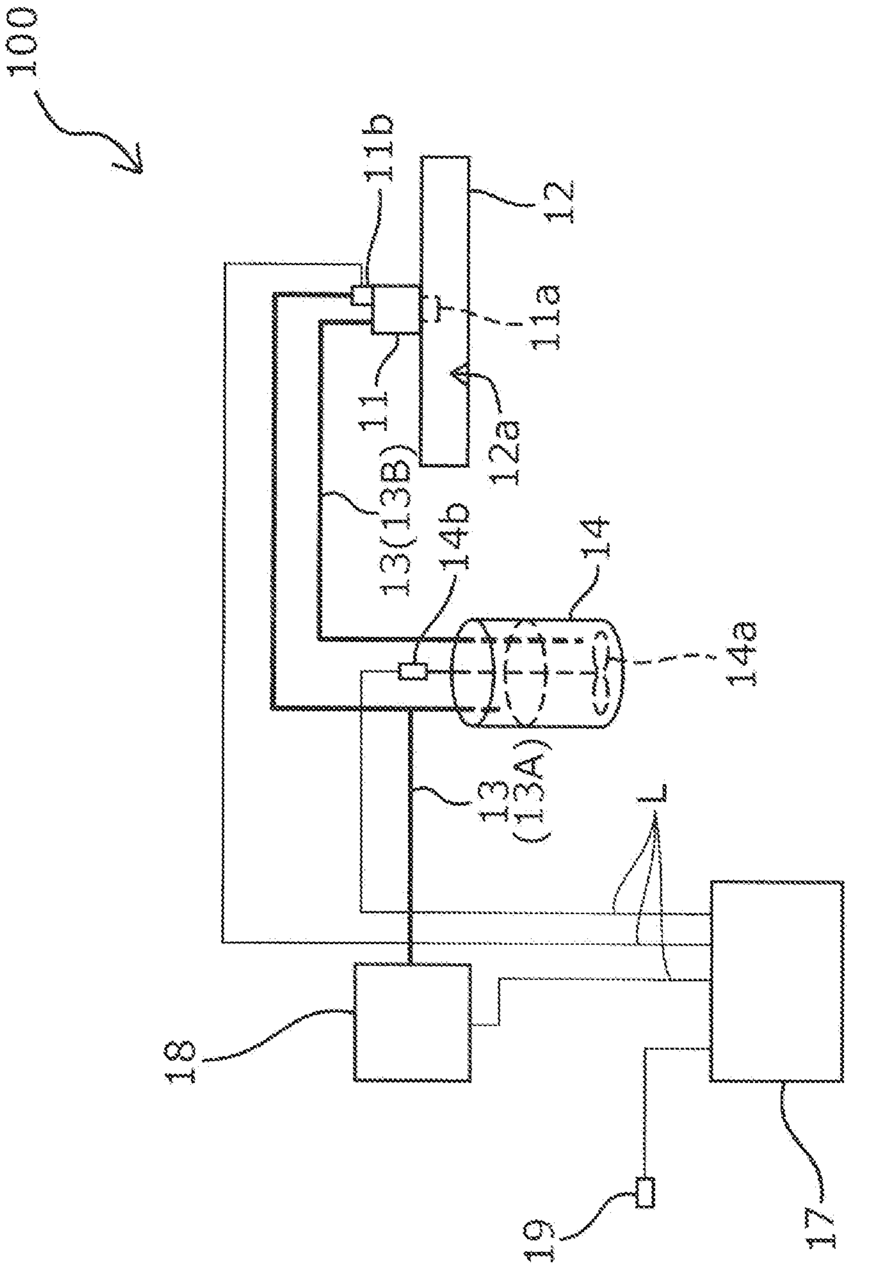
FIG. 13 is a block diagram illustrating an example of the pretreatment agent jetting device of the present disclosure.

Next, an example of a pretreatment agent jetting device 100 will be described with reference to FIG. 13. This device can be used with a printing apparatus that is obtained by removing the pretreatment agent jetting device 10 from the printing apparatus 1 according to Example 1 and the printing apparatus 1 according to Example 2. The device is not limited to this, and can also be used with a printing apparatus that performs printing with ink ejected onto the printing region R1 of the medium M.

As described above, the pretreatment agent jetting device 100 according to the example is a pretreatment agent jetting device used in a printing apparatus that performs printing with ink ejected onto the printing region R1 of the medium M. As illustrated in FIG. 13, the jetting unit 11 configured to jet the pretreatment agent and the lid member 12 to which the jetting unit 11 is attached, the lid member 12 being configured to cover the printing region R1 are provided. Thus, by jetting the pretreatment agent from the jetting unit 11 with the printing region R1 covered with the lid member 12, dispersion of the pretreatment agent can be suppressed, so that the printing region R1 of the medium M can be suitably provided with the pretreatment agent.

The pretreatment agent jetting device 100 according to the example further includes a pressure pump 18 that provides driving force to supply the pretreatment agent from the pretreatment agent storage unit 14 to the jetting unit 11, a control unit 17 electrically coupled to the pressure pump 18, the electromagnetic valve 11*b*, and the stirring bar driving unit 14*b* through the electrical wires L, and an interface terminal 19 that can be coupled to the printing apparatus. With such a configuration, the pressure pump 18, the electromagnetic valve 11*b*, and the stirring bar driving unit 14*b* can be driven under the control by the control unit 17. Furthermore, for example, through cooperation between the control unit 17 and the control unit of the printing apparatus and the like, the pressure pump 18, the electromagnetic valve 11*b*, and the stirring bar driving unit 14*b* can be driven under the control by the control unit of the printing apparatus.

Note that although the pretreatment agent jetting device 100 according to the example includes the control unit 17, it can have a configuration without the control unit 17. This is enabled with a configuration in which the control unit of the printing apparatus executes a drive program for the pretreatment agent jetting device 100. Furthermore, a configuration without the pressure pump 18 is also possible. This is enabled with a configuration in which a tube or the like is coupled to the pressure pump of the printing apparatus.

the present disclosure is not limited to the examples described above, and can be realized in various configurations without departing from the gist of the present disclosure. For example, appropriate replacements or combinations may be made to the technical features in the examples corresponding to the technical features in the aspects described in the SUMMARY section to solve some or all of the problems described above or to achieve some or all of the advantageous effects described above. Additionally, when the technical features are not described herein as essential technical features, such technical features may be deleted appropriately.

What is claimed is:

1. A printing apparatus comprising:

a support portion supporting a medium;

a jetting unit configured to jet a pretreatment agent onto the medium supported on the support portion;

a lid member to which the jetting unit is attached, the lid member being configured to cover a printing region of the medium by contacting the support portion so as to define an interior space including the printing region of the medium;

an ejecting unit configured to eject ink onto the printing region to which the pretreatment agent is jetted from the jetting unit; and a moving unit configured to move the support portion to a first position at which the lid member is configured to cover the printing region and a second position at which the ejecting unit is configured to eject the ink onto the printing region and at which the lid member does not cover the printing region.

2. The printing apparatus according to claim 1, comprising an ink storage unit configured to store the ink;

an ink flow path linking the ink storage unit and the ejecting unit;

a pretreatment agent storage unit configured to store the pretreatment agent;

a pretreatment agent flow path linking the pretreatment agent storage unit and the jetting unit; and a driving unit configured to provide driving force to supply the ink from the ink storage unit to the ejecting unit, wherein the driving unit is configured to provide driving force to supply the pretreatment agent from the pretreatment agent storage unit to the jetting unit.

3. The printing apparatus according to claim 1, wherein the lid member is configured to be positioned and form a sealed space inside by covering the printing region including the support portion supporting the medium.

4. The printing apparatus according to claim 1, wherein the jetting unit is detachably attached to the lid member.

5. The printing apparatus according to claim 4, wherein a heater unit, in place of the jetting unit, is detachably attached to the lid member.

6. The printing apparatus according to claim 4, wherein a first support portion and a second support portion that differs in at least one of size and shape from the first support portion are configured to be used as the support portion, and a first lid member corresponding to the first support portion and a second lid member corresponding to the second support portion are configured to be used as the lid member.

7. The printing apparatus according to claim 1, wherein a first support portion and a second support portion that differs in at least one of size and shape from the first support portion are configured to be used as the support portion, and the lid member includes a first fitting portion that fits with the first support portion and a second fitting portion that fits with the second support portion.

8. The printing apparatus according to claim 1, wherein the lid member is configured to cover a non-printing region around the printing region as well as the printing region, and an interval between the lid member and the non-printing region is smaller than an interval between the lid member and the printing region inside the lid member.

9. The printing apparatus according to claim 1, comprising a housing unit configured to accommodate the ejecting unit and an arm member having one end portion coupled to the housing unit and another end portion coupled to the lid member, wherein the arm member is configured to be displaced to a cover position at which the lid member covers the printing region when the support portion is at the first position and an open position at which the lid member does not cover the printing region when the support portion is at the first position, so as not to hinder movement of the support portion by the moving unit.

10. The printing apparatus according to claim 9, wherein the lid member is detachably attached to the arm member.

11. A pretreatment agent jetting device used in a printing apparatus that performs printing with ink ejected onto a medium, the printing apparatus including a support portion that supports the medium, the pretreatment agent jetting device comprising:

a jetting unit configured to jet a pretreatment agent and a lid member to which the jetting unit is attached, the lid member being configured to cover a printing region of the medium by contacting the support portion so as to define an interior space including the printing region of the medium.

* * * * *